United States Patent
Mazeau et al.

(10) Patent No.: US 11,568,330 B2
(45) Date of Patent: Jan. 31, 2023

(54) METHOD AND DEVICE FOR RECORDING DIGITAL DATA REPRESENTATIVE OF AN OPERATING VARIABLE OF AN OBSERVED SYSTEM

(71) Applicant: THALES, Courbevoie (FR)

(72) Inventors: Thierry Mazeau, Mérignac (FR); Alain Larroque, Mérignac (FR); Patrick Garrec, Mérignac (FR)

(73) Assignee: THALES, Courbevoie (FR)

( * ) Notice: Subject to any disclaimer, the term of this patent is extended or adjusted under 35 U.S.C. 154(b) by 457 days.

(21) Appl. No.: 16/717,666

(22) Filed: Dec. 17, 2019

(65) Prior Publication Data

US 2020/0202240 A1    Jun. 25, 2020

(30) Foreign Application Priority Data

Dec. 21, 2018 (FR) ...................................... 18 73839

(51) Int. Cl.
  *G06Q 10/04* (2012.01)
  *G06N 5/04* (2006.01)
  (Continued)

(52) U.S. Cl.
  CPC .............. *G06Q 10/04* (2013.01); *G01D 9/005* (2013.01); *G06N 5/04* (2013.01); *G06Q 10/20* (2013.01)

(58) Field of Classification Search
  CPC .......... G01D 9/005; G06N 5/04; G06Q 10/04; G06Q 10/20
  See application file for complete search history.

(56) References Cited

U.S. PATENT DOCUMENTS 9,628,499 B1 * 4/2017 Yu ........................ H04L 63/1416
10,067,038 B2   9/2018 Hou
(Continued)

FOREIGN PATENT DOCUMENTS

CN    103364016 A  * 10/2013 ............. G01D 9/005
EP    3 085 937 A2    10/2016

OTHER PUBLICATIONS

English machine translation of CN-103364016-A (Year: 2013).*
(Continued)

*Primary Examiner* — Roy Y Yi
*Assistant Examiner* — Geoffrey T Evans
(74) *Attorney, Agent, or Firm* — ArentFox Schiff LLP

(57) ABSTRACT

The invention relates to a method and a device for recording digital data representative of an operating variable of an observed system, the digital data representative of said variable being obtained in the form of samples, the method comprising a data recording over time. The method receiving successive samples representative of said observed variable, and for a current sample, for at least two observation windows of different sizes, each observation window including a number, equal to the size of said window, of successive samples received before the moment in time corresponding to the current sample,
  calculating an average value per observation window,
  calculating a difference between the current sample and each of said average values,
  comparing each difference, in absolute value, to a predetermined threshold value associated with said observation window, and in case of excess, triggering a recording of the current sample in a non-volatile memory.

10 Claims, 4 Drawing Sheets

(51) Int. Cl.
*G06Q 10/00* (2012.01)
*G01D 9/00* (2006.01)

(56) References Cited

U.S. PATENT DOCUMENTS

| 2013/0096391 | A1  | 4/2013  | Osorio et al. |
| 2018/0150036 | A1  | 5/2018  | Xu et al. |
| 2020/0285782 | A1* | 9/2020  | Fries .................... G06Q 50/06 |
| 2021/0390424 | A1* | 12/2021 | Vo .................... G06Q 30/0185 |

OTHER PUBLICATIONS

Bifet, A. et al. "Learning from Time-Changing Data with Adaptive Windowing", Proceedings of The 2007 Siam International Conference on Data Mining (18 Pages Total), (2007).

French Search Report, from the French Patent Office in counterpart French Application No. 1873839, dated Oct. 23, 2019.

Gama, J.,"Knowledge Discovery from Data Streams", Chapman and Hall/CRC, XP055555150, ISBN: 9781439826119, (258 Pages Total), (2010).

Kifer, D. et al.,"Detecting Change in Data Streams", Proceedings of the 30th VLDB Conference, Toronto, Canada, (12 Pages Total), (2004).

\* cited by examiner

[Fig 1]

METHOD AND DEVICE FOR RECORDING DIGITAL DATA REPRESENTATIVE OF AN OPERATING VARIABLE OF AN OBSERVED SYSTEM

CROSS-REFERENCE TO RELATED APPLICATIONS

This application claims priority to French Patent Application No. 18 73839, filed on Dec. 21, 2018. The disclosure of the priority application is incorporated in its entirety herein by reference.

FIELD OF THE INVENTION

The present invention relates to a method and device for storing digital data representative of operating variables, evolving over time, of a physical system.

The invention is particularly applicable in the field of the monitoring and predictive maintenance of systems. This field is known under the acronym HUMS for "Health and Usage Monitoring System". It is also especially applicable to integrated maintenance, which generates alerts.

BACKGROUND OF THE INVENTION

Integrated and predictive monitoring and maintenance implements an operating data reading of the equipment of a system, using appropriate sensors, the data being read over time. These data are next processed by calculation algorithms to perform proper operation tests, and various diagnostics making it possible for example to predict the wear of the equipment of the system, and a breakdown risk. The implementation of such algorithms advantageously makes it possible to avoid any breakdowns, therefore to increase the operating security of the system and to reduce the maintenance costs.

HUMS systems have applications in many fields, for example for the supervision and maintenance of industrial manufacturing systems, piloting systems, or embedded environmental monitoring systems, for example airborne.

Conventionally, it is necessary to observe and record very large volumes of operating data, with a sufficiently fine recurrence not to miss any significant state changes of the observed operating variable. This causes a need for storage areas, for example nonvolatile memories, having very large capacities. In practice, this involves a large bulk, which is sometimes not compatible with the field of application, for example in an airborne system.

The invention aims to address these drawbacks, by proposing a recording method and device making it possible to reduce the volume of data recorded for an observed operating variable.

SUMMARY OF THE INVENTION

To that end, according to one aspect, the invention proposes a method for recording digital data representative of an operating variable of an observed system, the digital data representative of said variable being obtained in the form of samples, the method comprising a data recording over time. This method comprises the following steps:
  receive successive samples representative of said observed variable, and
  for a current sample, for at least two observation windows of different sizes, each observation window including a number, equal to the size of said window, of successive samples received before the moment in time corresponding to the current sample,
  calculating an average value per observation window.
  calculating a difference between the current sample and each of said average values.
  comparing each difference, in absolute value, to a predetermined threshold value associated with said observation window, and if the threshold value is exceeded for a threshold value, triggering a recording of the current sample in a non-volatile memory.

Advantageously, the invention makes it possible to trigger the recording, in case of observed variations as a function of observation windows of different durations, which makes it possible to avoid recording digital data with close values, white triggering the recording in case of observation of a variation over time.

The data recording method according to the invention may have one or more of the features below, considered independently or in combination, according to all technically acceptable combinations.

The method implements a plurality of observation windows of increasing sizes.

The threshold values are all equal to a same threshold value.

Each threshold value is calculated as a function of the average value calculated for the corresponding observation window and a standard deviation of the samples of the corresponding observation window.

According to another aspect, the invention relates to a device for recording digital data representative of an operating variable of an observed system, the digital data representative of said variable being obtained in the form of samples, the device being configured to perform a digital data recording over time. This device comprises modules configured to:
  receive successive samples representative of said observed variable, and
  for a current sample, for at least two observation windows of different sizes each observation window including a number, equal to the size of said window, of successive samples received before the moment in time corresponding to the current sample,
  calculate an average value per observation window,
  calculate a difference between the current sample and each of said average values.
  compare each difference, in absolute value, to a predetermined threshold value associated with said observation window, and if the threshold value is exceeded for a threshold value, trigger a recording of the received sample in a non-volatile memory.

The data recording device according to the invention may have one or more of the features below, considered independently or in combination, according to all technically acceptable combinations.

The modules are made by analog components.

The device includes a computing processor, a non-volatile electronic memory unit, and a random-access memory unit, and modules are made in software form including software instructions implemented by the computing processor.

The device implements a plurality n of observation windows of increasing sizes.

According to another aspect, the invention relates to a method for monitoring and predictive maintenance of a physical system, including a capture at a predetermined temporal frequency of digital data representative of an operating variable of the system, implementing a method for recording data as briefly described above in a memory unit and implementing an algorithm for monitoring and predictive maintenance from recorded data.

According to another aspect, the invention relates to a system for monitoring and predictive maintenance of a physical system, including at least one sensor suitable for detecting, at a predetermined temporal frequency of digital data representative of an operating variable of said physical system, implementing a device for recording data as briefly described above in a memory unit and including a processor configured to implement an algorithm for monitoring and predictive maintenance from recorded data.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF EMBODIMENTS

The invention will be described hereinafter more particularly as it applies in a monitoring and predictive maintenance system.

Figure 1:
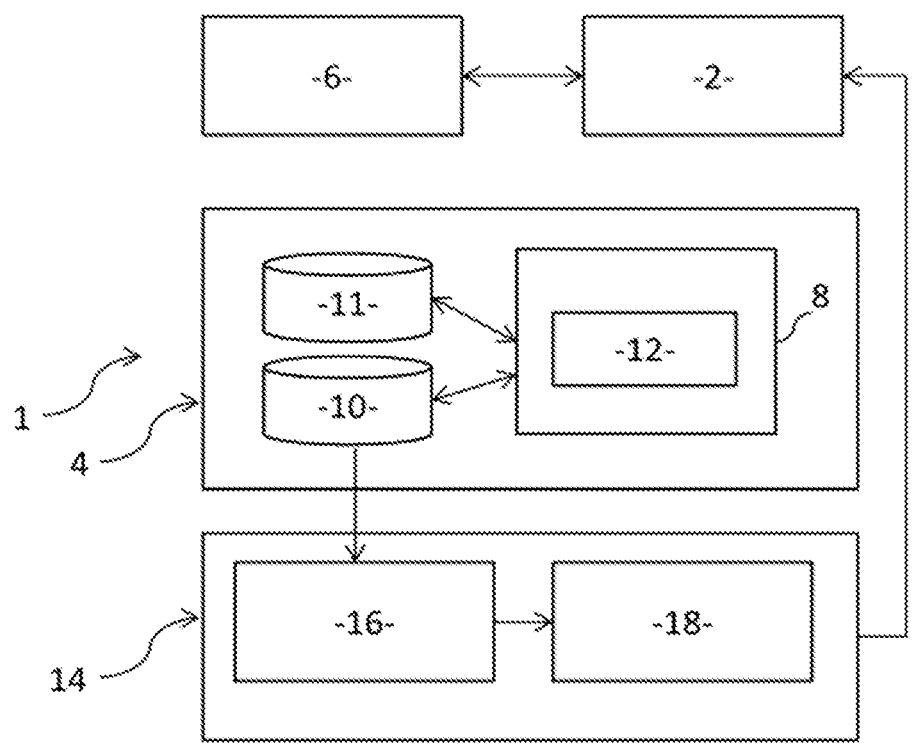
FIG. 1 is a block diagram of a system for monitoring and predictive maintenance of a physical system implementing a recording device according to a first embodiment of the invention.

One embodiment of such a system 1 is shown schematically in FIG. 1.

The monitoring and predictive maintenance system 1 of a physical system 2 includes a device 4 for recording digital data representative of operating variables of the system 2, obtained by appropriate sensors 6.

For example, the physical system 2 is an airborne radar, and the operating variable(s) are for example power sources, gain or frequency regulation values, radiofrequency power values, voltage or current values. In this case, the sensor 6 is for example formed by an operational amplifier and an analog/digital encoder (ADC), a radiofrequency detector and an ADC, a frequency/voltage converter and an ADC.

The detected data are sent to the recording device 4 in the form of digital samples, each digital sample having an associated value, obtained with a predetermined sampling frequency.

In a first embodiment, the recording device 4 is an electronic computing device, for example a computer or a programmable logic component, such as an FPGA (Field Programmable Gate Array), a GPU (Graphic Processing Unit) or a GPGPU (General-purpose Processing on Graphic Processing Unit), or a dedicated integrated circuit, such as an ASIC (Application-Specific Integrated Circuit).

The recording device 4 in particular includes a computing processor 8, a non-volatile electronic memory unit 10, and a random-access memory unit 11. The memory unit 10 is configured to record the data representative of the operating variable of the system 2 according to the recording method of the invention.

In this first embodiment, the data recording method is done in the form of software 12, including program instructions, and executable by the computing processor 8.

The monitoring and predictive maintenance system 1 also includes a device 14 for implementing a monitoring and predictive maintenance algorithm from data 16 recorded in the memory unit 10. It also includes a module 18 for generating alerts and/or information for improvement and/or correction, configured to send the alerts and/or the information to the physical system 2.

Figure 2:
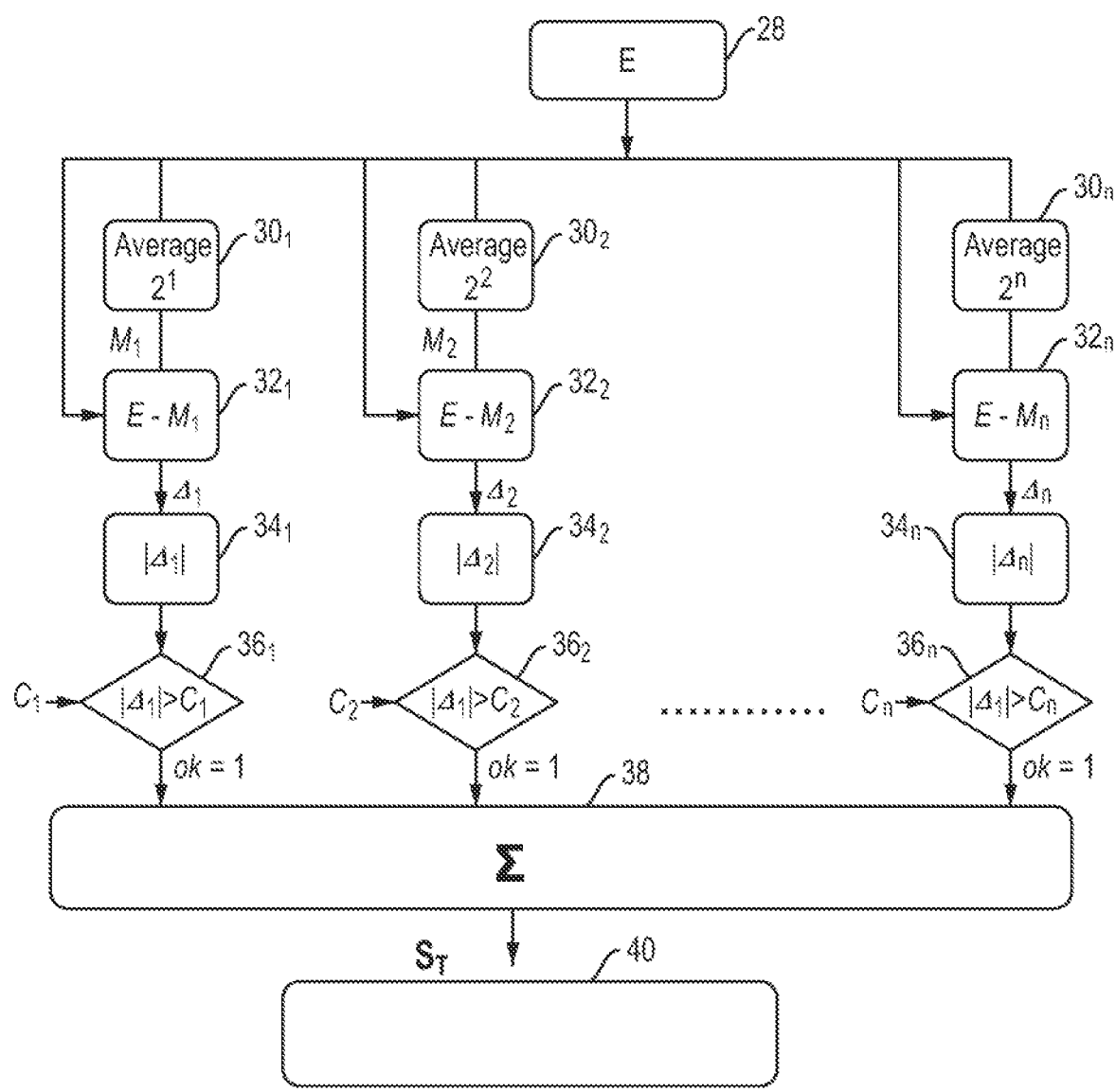
FIG. 2 is a block diagram of the main steps of a data recording method according to one embodiment of the invention.

FIG. 2 schematically illustrates an embodiment of a data recording method according to the invention.

Data representative of a variable are received in the receiving step 28, at regular time intervals in the form of samples E, at moments in time $t_j$.

To simplify the notations, a current sample is denoted E in FIG. 2.

The processing is done on n branches, implemented substantially in parallel or successively, as explained in detail hereinafter.

Following the reception of the sample E, average values on observation windows $F_i$ of different durations are calculated in steps $30_1$ to $30_n$.

In the exemplary embodiment of FIG. 2, a number n of average values is calculated on observation windows $F_i$ with sizes expressed in number of successive samples received before the moment in time corresponding to the current sample, which corresponds to a temporal duration, the samples being received at regular time intervals. Indeed, when the samples are received every $T_{ech}$, $T_{ech}$ being the sampling period, an observation window of M samples has a temporal duration of $M \times T_{ech}$.

In this example, an observation window $F_i$ comprises $2^i$ samples. The observation windows are sliding, that is to say, they are positioned relative to the current moment in time.

The number n of observation windows and their respective sizes are parameters of the method, which are set as a function of the observed operating variable or the observed physical system 2. For example, n the embodiment of FIG. 2, the number n is between 2 and a number N calculated as a function of the longest desired observation period (temporal duration of an observation window) The duration of the observation window Tmax is given as a function of the sampling period by the formula $T_{max} = N \times T_{ech}$. For example, the sampling period $T_{ech}$ is 100 ms. For the monitoring of a food, knowing that the maximum duration of a variation is related to the temperature variations and is estimated at 15 min, for a sampling period of 100 ms, N=9000.

When the size of the observation window is small, the fast variations are detected. Conversely, when the size of the observation window is large, the calculated average is not sensitive to fast variations, but representative of a slow variation.

Figure 3:
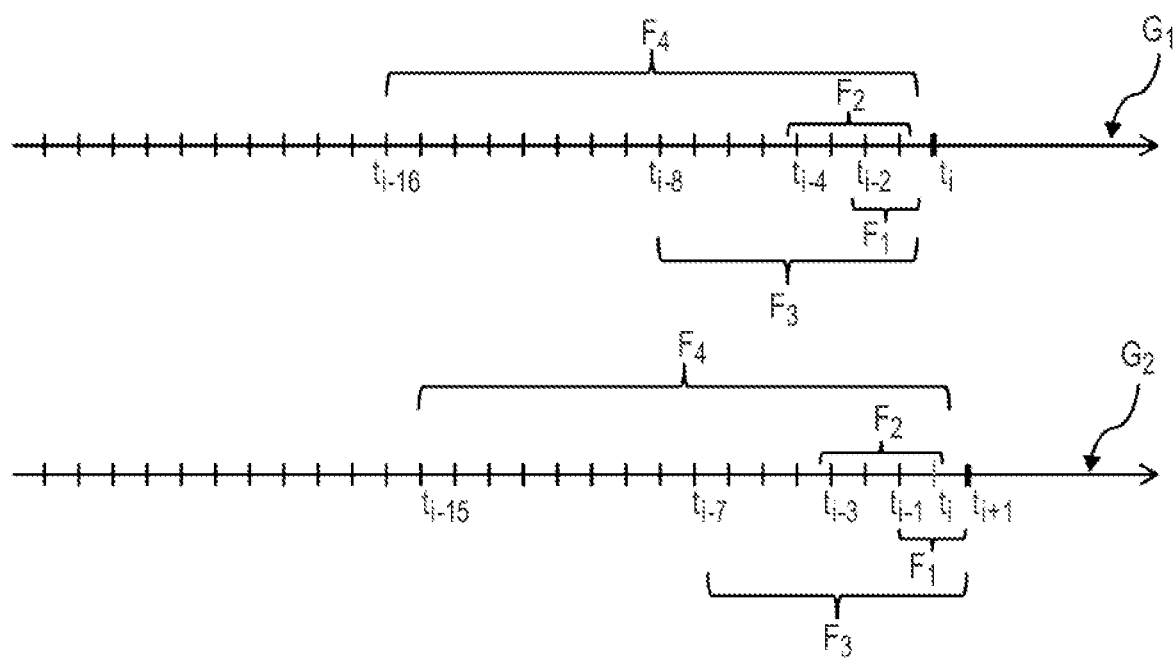
FIG. 3 schematically illustrates a plurality of sliding observation windows used in the data recording method.

FIG. 3 schematically shows observation windows $F_1$, $F_2$, $F_3$, $F_4$ positioned on the time axis $G_1$ relative to a current moment in time $t_i$, and on the time axis $G_2$ relative to a current moment in time $t_{i+1}$.

In a variant, the current sample at the current moment in time t is taken into account in the observation windows $F_1 \ldots F_n$.

Following the implementation of the calculation of averages $30_1$ to $30_n$, n average values denoted $M_1$ to $M_n$ are obtained, each average $M_i$ being calculated over an observation window of $2^i$ samples.

Each calculated average value $M_i$ is subtracted from the current sample value E (steps $32_1$ to $32_n$), which makes it possible to obtain a difference value Next, the absolute values of the differences, $|\Delta_i|$, are calculated during steps for obtaining absolute values $34_1$ to $34_n$.

For each observation window taken into consideration, the absolute value of the difference calculated in step $34_1$ to $34_n$ is compared to a threshold value $C_1$ to $C_n$ corresponding to the comparison step $36_1$ to $36_n$.

The threshold values $C_1$ to $C_n$ are parameters of the method.

In one embodiment, the threshold values $C_i$ are chosen as being a percentage of the maximum variation value of the signal whose samples E are received, and are stored prior to the execution of the recording method. For example, the percentage of the maximum variation value depends on the monitored operating variable.

In another embodiment, the threshold values $C_1$ are calculated as a function of the average and the standard deviation of the samples of the corresponding observation window, for example according to the formula:

$$C_i = M_i + k \times \sigma_i$$

Where $\sigma_i$ is the standard deviation of the samples of the corresponding observation window, and k is a multiplier factor. For example, k=3.

In this embodiment, the threshold values $C_i$ evolve over time, according to the temporal sliding of the observation windows, in the same way as the average values $M_i$.

In another embodiment, the threshold values Ci are all equal to a threshold value C.

For example, to monitor a power source, the thresholds are defined as a function of the noise of the power source for the short averages and as a function of a maximum variation level estimated as a function of the maximum consumption, for example: 5%.

The threshold applied on the short average is 3 times the amplitude of the noise, the threshold applied on the longest average of 5% of the supply voltage. The thresholds applied on the intermediate averages are defined by linear interpolation as a function of the durations of the averages.

Once one of the difference absolute values $|\Delta_i|$ exceeds the threshold value $C_i$, a binary sum $\Sigma$ done in step 38 is set to 1, and a signal $S_T$ triggering the recording is emitted Step 38 is then followed by a step 40 for recording the current sample E in a non-volatile memory.

The samples used for the calculations $30_i$ of the averages and the average values $M_i$ are stored only temporarily, in the random-access memory, during the execution of the method.

If none of the difference absolute values $|\Delta_i|$ exceeds the corresponding threshold value $C_i$, the current sample is not recorded, since it is considered that its recording is not useful, inasmuch as its value is not significantly different from the average values calculated on the observation windows of different durations.

After having performed step 38, the method returns to step 28 for receiving a following sample, and steps $30_i$ to $36_i$ are iterated, with sliding observation windows.

Figure 4:
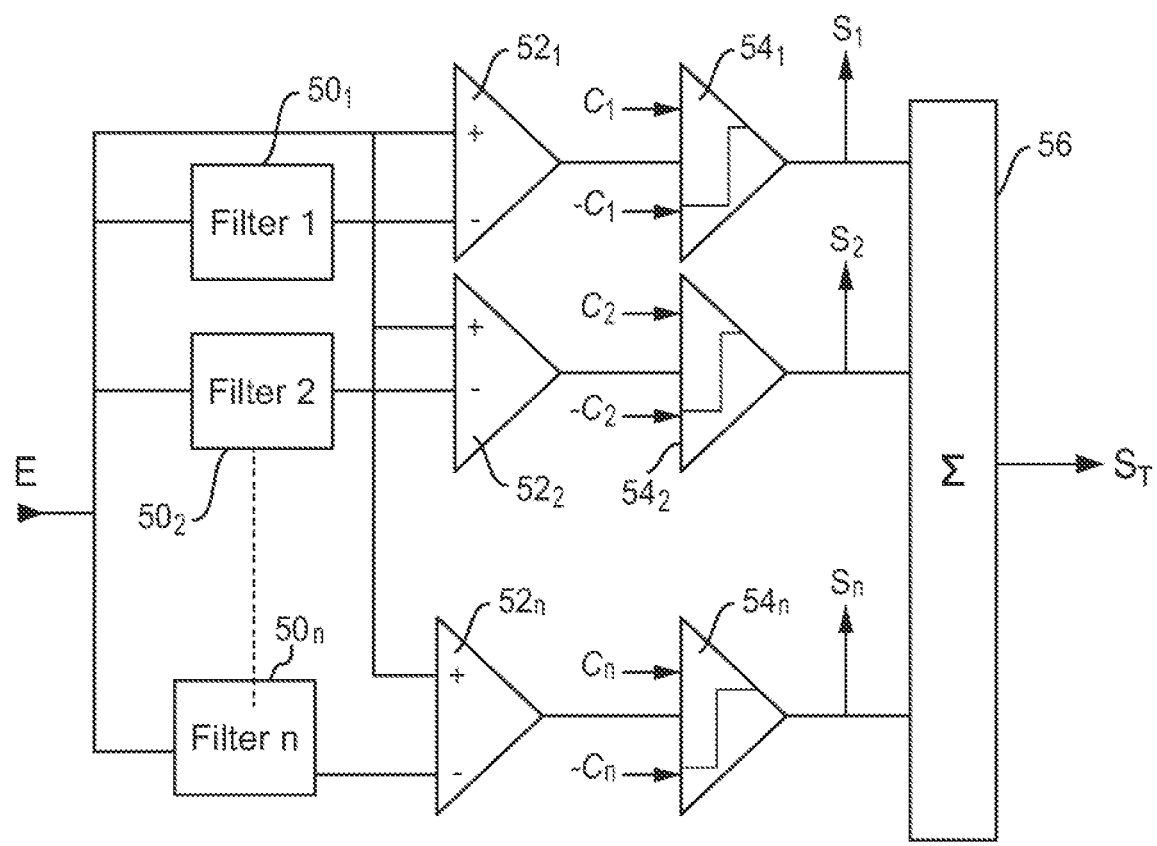
FIG. 4 is a block diagram of a data recording device according to a second embodiment of the invention.

FIG. 4 illustrates a second embodiment of the recording device 4 according to the invention.

In this second embodiment, the recording device 4 is an analog device, which comprises a plurality of filters $50_1$ to $50_n$. Each filter $50_i$ performs an average over samples obtained by high-pass filtering at a cutoff frequency $1/T_i$ where $T_i$ is the duration of the corresponding observation window.

The difference $\Delta_i$ between the current sample and each average value $M_i$, obtained at the output of the filter $50_i$, is obtained by a comparator $52_i$. The obtained difference values are compared to the corresponding thresholds $C_i$ by window comparators $54_i$.

At the output of each window comparator $54_i$, a signal $S_i$ is obtained that indicates whether the difference $\Delta_i$ is comprised between the threshold values $-C_i$ et $C_i$, the signal $S_i$ being equal to 1, for example, when the value $\Delta_i$ is not between the threshold values.

A sum of the signals $S_i$ is done by a module 56 that generates the control signal $S_T$ for recording of the sample E is obtained at the output of the module 56. Similarly to the first embodiment, the signal $S_T$ commands recording when one of the signals $S_i$ is equal to 1.

Advantageously, the simultaneous taking into account of averages calculated over observation windows with different durations makes it possible to verify the presence of both short-term and longer-term variation.

In the embodiments of the invention described above, the observation windows have been chosen with increasing sizes, multiplied by two between two successive windows. In a variant, it is possible to choose other sizes of observation windows. For example, the sizes of observation windows $Taille_k$ can progress according to another law, for example a progression of the type: $Taille_k = Taille_{k-1} + L$, with L an integer value, for example L=1.

Likewise, in the described embodiments, it has been considered that observation windows of increasing sizes according to a regular progression are used. In a variant, it is possible to choose a subset of observation windows, for example to use only the windows F1 and F4, in which case only short-term variations are taken into consideration, or to use the windows F4 to F12, in which case the short-term variations are not taken into consideration.

It is also noted that the method according to the invention works after receiving a number of samples at least equal to the size $Taille_n$ of the largest observation window $F_n$. In one embodiment, the method is implemented with a lag time allowing the reception of enough samples.

In a variant, it is possible to initialize the values of the $Taille_n$ first samples to default values.

Advantageously, the method of the invention makes it possible to take account of fast and slow variations, and to trigger recordings when variations are observed. Thus, the recorded digital data (the samples) are representative of variations of the observed operating variable and allow monitoring and predictive maintenance calculations. Conversely, when the samples of the observed operating variable have substantially close values over a temporal duration greater than or equal to the duration of the observation window $F_n$, no recording is done, therefore the size of the necessary nonvolatile storage memory is decreased.

The invention claimed is:

1. A method for recording digital data representative of an operating variable of an observed system, the digital data representative of said variable being obtained in the form of samples, the method comprising a data recording over time, the method comprising the following steps:
   receiving successive samples representative of said observed variable, and
   for a current sample, for at least two observation windows of different sizes, each observation window including a number, equal to the size of said window, of successive samples received before the moment in time corresponding to the current sample,
   calculating an average value per observation window,
   calculating a difference between the current sample and each of said average values, comparing each difference, in absolute value, to a predetermined threshold value associated with each of said at least two observation windows, and if the threshold value is exceeded for the threshold value associated with one of the observation windows, triggering a recording of the current sample in a non-volatile memory, the recording of the current sample being triggered only when the threshold value is exceeded for a threshold value associated with one of the observation windows.

2. The recording method according to claim 1, implementing a plurality of observation windows of increasing sizes.

3. The recording method according to claim 1, wherein the threshold values are all equal to a same threshold value.

4. The method according to claim 1, wherein each threshold value is calculated as a function of the average value calculated for the corresponding observation window and a standard deviation of the samples of the corresponding observation window.

5. A method for monitoring and predictive maintenance of a physical system, including a capture at a predetermined temporal frequency of digital data representative of an operating variable of the system, implementing a method for recording data according to claim 1 and implementing an algorithm for monitoring and predictive maintenance from recorded data.

6. A device for recording digital data representative of an operating variable of an observed system, the digital data representative of said variable being obtained in the form of samples, the device being configured to perform a digital data recording over time, the device comprising modules configured to:

receive successive samples representative of said observed variable, and for a current sample, for at least two observation windows of different sizes, each observation window including a number, equal to the size of said window, of successive samples received before the moment in time corresponding to the current sample, calculate an average value per observation window, calculate a difference between the current sample and each of said average values, compare each difference, in absolute value, to a predetermined threshold value associated with each of said at least two observation windows, and if the threshold value is exceeded for the threshold value associated with one of the observation windows, trigger a recording of the received sample in a non-volatile memory, the recording of the current sample being triggered only when the threshold value is exceeded for a threshold value associated with one of the observation windows.

7. The recording device according to claim 6, wherein the modules are made by analog components.

8. The recording device according to claim 6, including a computing processor, a non-volatile electronic memory unit, and a random-access memory unit, wherein said modules are made in software form including software instructions implemented by the computing processor.

9. The recording device according to claim 6, implementing a plurality of observation windows of increasing sizes.

10. A system for monitoring and predictive maintenance of a physical system, including at least one sensor suitable for detecting, at a predetermined temporal frequency of digital data representative of an operating variable of said physical system, implementing a device for recording data according to claim 6, and including a processor configured to implement an algorithm for monitoring and predictive maintenance from recorded data.

* * * * *